March 19, 1968 K. L. TATE ET AL 3,373,619

INSTRUMENT MOVEMENT

Original Filed Sept. 27, 1961

3,373,619

INSTRUMENT MOVEMENT

Kenneth L. Tate, Howard R. Jaquith, Harold S. Hopkins, and Nathaniel B. Nichols, Rochester, N.Y., assignors to Taylor Instrument Companies, Rochester, N.Y., a corporation of New York Original application Sept. 27, 1961, Ser. No. 141,127, now Patent No. 3,256,740, dated June 21, 1966. Divided and this application Oct. 4, 1965, Ser. No. 529,610
10 Claims. (Cl. 74—89.2)

ABSTRACT OF THE DISCLOSURE

A tape drive, for transforming relatively small deflections of a moving part into relatively large deflections of an indicator or the like, includes a sector having a cylindrical surface and being deflectible about the axis of the cylindrical surface. A cylindrical segment is coaxially fixed to a rotatable shaft mounted parallel to the axis of the sector's cylindrical surface. The cylindrical surface of the sector and the segment are substantially tangent. A flat flexible tape is secured at one end to the sector, passes over the cylindrical surface of the sector, between sector and segment, and thence over the segment, lying flat on the surfaces of the latter and having its other end secured to the segment. Another flat flexible tape has one end secured to the segment, passes around the segment as if a combination of the first tape, goes between segment and sector, and thence along the cylindrical surface of the sector, having its other end secured to the sector. The tapes run parallel to each other so that if the sector is deflected, one tape can be wound upon the segment for the major part of a revolution thereof, while the other tape is correspondingly unwound from the segment. Of the four tape ends, three are rigidly fixed in place, while the fourth is fixed in place by a spring. The shaft is mounted in bearings, one on each side of the general plane of the sector. The one bearing is an ordinary bearing allowing the shaft to rotate only. The other bearing is a slot whose length lies along a radius of deflection of the sector. The slot allows irregularities in the tape and surfaces of segment and sector to deflect the shaft along the slot against the pull of the spring which tensions the tapes and draws the segment against the cylindrical surface of the sector with only a thickness of tape separating sector and segment surfaces. The normal play in the first mentioned allows the necessary deflection of shaft toward or away from the cylindrical surface of the sector.

The present application is a division of application for U.S. Letters Patent, S.N. 141,127, filed Sept. 27, 1961, now U.S. Letters Patent No. 3,256,740, issued June 21, 1966, and assigned to the assignee of the present application.

This invention relates to precision instrument movements, such as are customarily used in translating relatively-small, low-energy movements of a Bourdon tube or the like into relatively-large deflections of a pointer or the like, as disclosed, for example in the above-identified U.S. Letters Patent. The field of instrument movements is of long standing and has been highly cultivated.

The present invention relates to movements of the sort disclosed in U.S. Letters Patent No. 2,948,887, wherein a cylindrical segment is driven by a circular sector such that the segment, in effect, rolls along the circular portion of the sector, by virtue of a flexible, inextensible tape or cord means wound around the segment and connected at either end to points on the sector spaced from each other and the segment, with the segment somewhere therebetween. One problem involved is to prevent play, friction and binding of the parts involved, a somewhat contradictory intention, since if there is no play between parts, irregularities of the contours of the parts cause a certain amount of binding or friction to be produced.

According to the present invention, the segment is constrained to contact the sector as closely as the flexible means permits. If the segment were rotatably mounted by conventional bearings such as to restrict it to rotation, irregularities would increase bearing friction. According to the invention, the rotatable support for the segment is designed to permit the segment to shift its axis of rotation, to accommodate irregularities, but only along a radius of the sector deflection. Further, according to the invention, the sector is provided with a shoe having a circularly cylindrical surface along which the segment, in effect, rolls, since in this way a minimum of irregularity in fabrication of the sector is obtained. Other features and advantages of the invention will appear hereinafter, infra.

Figure 1:
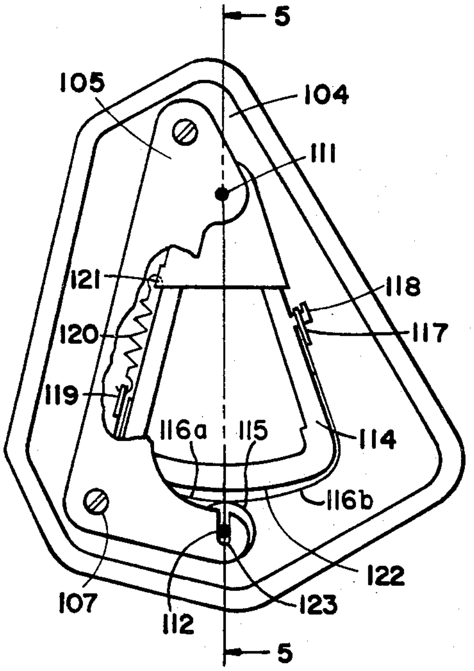
FIGURE 1 is a plan view of the invention, partly broken away.
Figure 2:
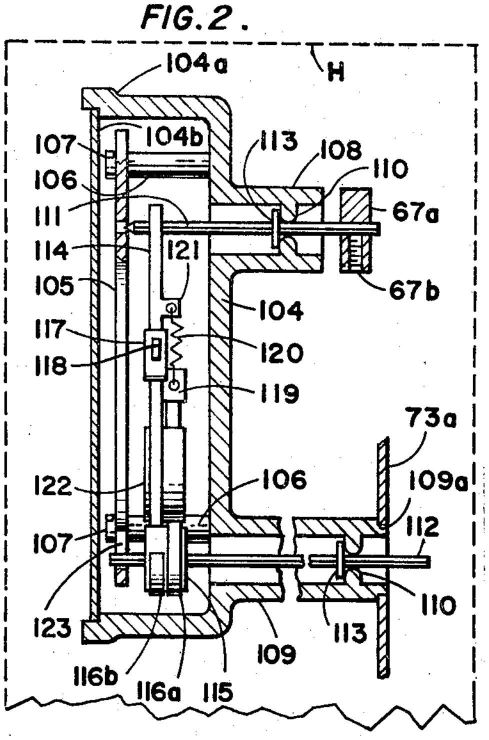
FIGURE 2 is a sectional view on the line 5—5 of FIGURE 1, showing an elevation in more detail of the moving parts depicted in FIGURE 1.

Referring to FIGURES 1 and 2, the instrument movement according to the invention is supported by means of a base 104 (not shown in FIGURE 1) and plate 105, there being provided a pair of posts 106, fixed to base 104. Plate 105 is supported on posts 106, a pair of screws 107 securing the plate 105 in fixed position on the posts 106.

Base 104 has a pair of nipples 108 and 109 projecting therefrom, each provided with a rotary bearing 110 of any suitable type to support one end of one or the other of a pair of shafts or staffs 111 and 112 running through the nipples 108 and 109.

Each of shafts 111 and 112 have a collar 113, or like means, to limit axial play thereof, the left-hand end of said shaft 111 being pointed to rotatably support the said shafts in a conical depression in plate 105. A different disposition is made of shaft 112, however, to be described later. A minor amount of axial play of the shafts is provided to permit them to rotate freely.

A sector 114 is fixed to shaft 111, projecting radially from the shaft for deflection thereby between plate 105 and base 104. A collar 67a, fixed in position on shaft 111, by means of a set screw 67b, is provided as a means of securing a suitable lever (not shown) by means of which the motion of a Bourdon tube or the like can be imparted to shaft 111.

Shaft 112 has a cylindrical segment 115 fixed thereto for rotation of said shaft by said segment 115, the cylindrical axis of the latter lying on the axis of rotation of shaft 112.

A pair of tapes 116a and 116b interconnect segment 115 and sector 114. An apertured plate 117, secured to one end of tape 116b, as by a spot weld, is hooked over a lug 118 projecting from sector 114. An apertured plate 119, secured to one end of tape 116*a*, as by a spot weld, is hooked to one end of a spring 120 and said spring has its other end hooked into an apertured ear 121 projecting from sector 114.

Each of the other ends of tapes 116*a* and 116*b* are fastened to the peripheral surface of segment 115, as by spot welds, or other suitable means. A smoothly curved plate or shoe 122 completes the tape drive, said plate being secured to the circular periphery of sector 114 to provide a cylindrical surface on which the thin tapes may be substantially flush with the surface of the plate. The extremities of the plate are curved smoothly around to direct the sector ends of the tapes to their points of fixation on sector 114.

Looking at FIGURES 1 and 2, it will be observed that tape 116*b* follows the surface of shoe 122, passing between it and segment 115 and thence around the segment back toward its origin. Tape 116*a* does likewise, but in the opposite direction. The total effect is as if a single tape were secured to end of shoe 122, passed between shoe and segment, then around the segment and between it and the shoe again, and thence to a point of fixation at the other end of the shoe.

Preferably, sector and segment, as well as the tapes, are metal and, for strength and stability and for lightness, both segment and sector may be built up into their illustrated shapes from sheet stock of any suitable, relatively-light but strong metal.

A tape drive as described above has very little friction and, using substantially perfectly flexible and inextensible metal tapes, the main force opposing deflection of the sector is spring 120 and is very nearly constant with respect to angular position of the sector.

Tapes and spring 120 are dimensioned so that the tapes are under a continual tension in all positions of sector 114. This tends to draw segment 115 up against the surface of plate 122, with the tapes 116*a* and 116*b* sandwiched in between. Any deviations from cylindricity of the surface of either of segment 115 and plate 122 of sector 114, or variation in tape thickness will cause segment 115 to push away from, or pull toward plate 122. Accordingly, we provide a slot 123 in plate 105, said slot lying more or less along a radius of sector 114. As a result, a very slight amount of side play in bearing 110 of nipple 109 will permit shaft 112 to move up and down with the dimensional irregularities mentioned supra. Were the left-hand end of shaft 112 rotatably supported in a conventional rotary bearing in plate 105, the cocking of the shaft due to the effect of dimensional irregularities of plate 122, segment 115 and/or the tapes, would create undesirable wear and friction in the tape mechanism, unless an undesirably large amount of play were provided in the bearings. The slot 123, on the other hand, provides the necessary play substantially only in the up and down sense needed, the sides of the slots performing the function of preventing staff 112 from cocking to one side or the other when sector 114 deflects.

The tape mechanism functions like a rack and pinion movement but unlike the rack and pinion with meshing teeth, the tape drive does not depend on the proper positioning of a rack shaft and a pinion shaft to cause the rack and pinion teeth to intermesh properly. In the tape drive, the corresponding role is played by the tapes, the bearings of shaft 112 only being required to prevent displacement of the shaft along the arc of movement of sector 114. Therefore, bearing play is for the most part of little moment.

The tapes 116*a* and 116*b* are preferably made as thin and as low in spring rate as possible, suitably 0.0015 in. thick Elgiloy or stainless steel. The abruptness of curvature of segment 115 is limited to that which the tapes will bear without being overstressed. The length of that part of plate 122 which must be truly cylindrical must be sufficiently longer than that needed to traverse a scale of given length, in order that at neither limit of said scale will a portion of tape bent around either extremity of plate 122 begin to wrap on segment 115. Obviously, the linearity of the ratio between sector deflection and rotation of shaft 112 depends on the plate 122 and segment 115 being truly cylindrical at their juxtaposed surfaces and on tapes 116*a* and 116*b* being of uniform thickness. As the term "segment" suggests, segment 115 need have a cylindrical surface only to the extent required to provide for wrapping the tapes flush thereon, in this case, about 270° around the segment axis.

Since the effective tape length includes spring 120, the tape-inextensibility requirement may seem to be nugatory. However, the desideratum is that there be no permanent change in tape length due to stress in the tapes. This is the case if the tapes are indeed "inextensible," and presuming that spring 120 behaves as a good spring is supposed to behave.

Figures 3, 4:
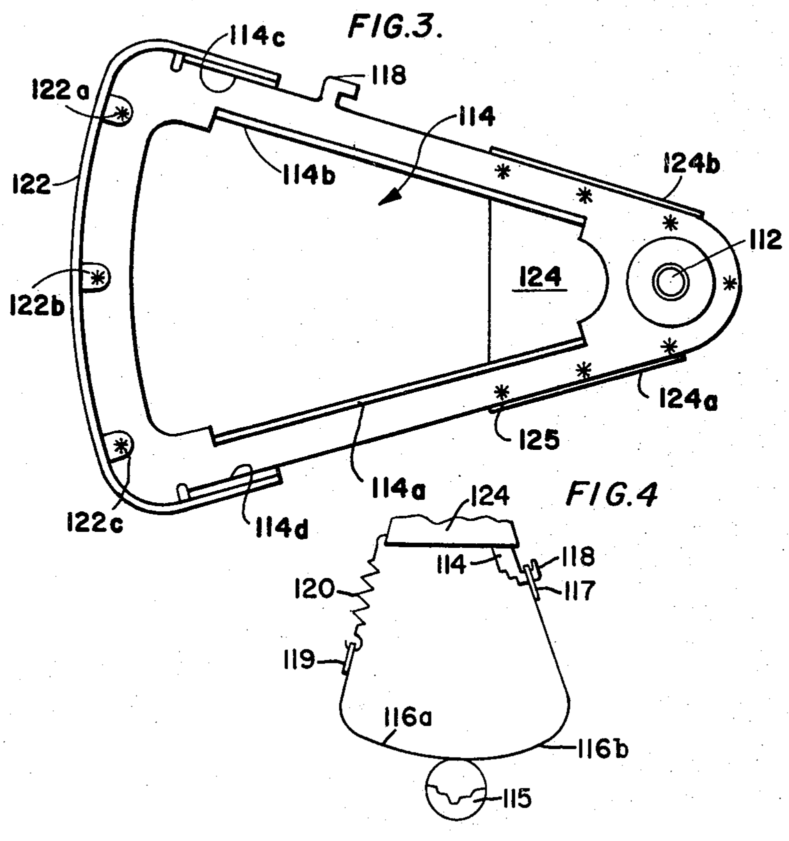
FIGURE 3 is an enlarged plan view of a sector according to the invention.
FIGURE 4 illustrates the general configuration of the tape forming part of the invention as shown in FIGURE 1.

It will be noted from the foregoing description of the tape and sector and segment drive that the tape is constrained to assume essentially a figure-8 loop about the sector and segment. This configuration is evident from FIGURE 4, and will be seen to imply a necessity for each tape to reverse its curvature in zero distance; in other words, pass through a point of inflection as it would were it of zero thickness, and the sector and segment were spaced from each other by zero-distance. That is, the tapes are means of achieving the effect of a direct and perfect frictional line contact between sector and segment. FIGURE 4, it will be seen, is merely FIGURE 1 shorn of all but the tape and such of segment 115 and sector 114 as provides the effective points of fixation thereto of the tapes.

However, it is impractical to try to realize such a state of affairs, even within the limits of the 0.0015 thickness of practical tapes. The reason is that each tape is not perfectly flexible, wherefore, as its configuration is constrained to increasingly approximate the inclusion of a point of inflection, a larger and larger bending moment is required. With typical tape materials, it is found that the stress required to overcome this bending moment is so high at a sector and segment spacing of the tape thickness that an undesirably large reaction due to the bending moment tends to force sector and segment apart. The reaction is so large as to create an inordinate amount of friction in the bearings of shafts 111 and 112.

On the other hand, as the spacing between sector and segment increases, there results a decrease in the angle subtended by tangentially directed components of tape tension on the segment decreases. Since the said components both coact to pull the segment toward the sector, their resultant component of force directed toward the sector axis and along codirectional radii of segment and sector increases.

In addition, as the sector deflects from a centered position, the said tangential components vary inversely to each other from a state of equality existing when the sector is in the centered position, where equal lengths of the tapes are pulling against each other. Hence, tape tension also creates a centering effect on the sector in that a force is created, upon sector deflection that is proportional to the deflection from the centered position (equal lengths of tape pulling against each other—the position suggested by the illustration of the tape movement in the several figures), and opposing deflection from that position. This centering effect is undesirable, especially where the tape movement would exert a variable loading on the driving element, as for example, a Bourdon tube.

These tension effects become more pronounced as sector-segment spacing increases. Since the previously-described tape bending moment effect decreases as the said spacing increases, there is some optimum sector-segment spacing, greater than a thickness of a tape, and the lesser in absolute magnitude, the thinner the tape. This optimum is most practically defined as—and determined by—the spacing at which the friction-torque, to be overcome in setting the segment 115 in motion by deflecting sector 114, is at a minimum.

With an 0.0015–0.0018 in. Elgiloy or equivalent tape, about 0.004 to 0.007 in. is optimum as sector to segment spacing, on the foregoing basis.

Since the tension in spring 120 controls the spacing (because of the spring's tendency to flatten the tape where it comes off the segment), the spring is chosen to be just strong enough to pull the segment to the right distance from the sector. The right distance, of course, is that distance at which the torque needed to turn the sector is a minimum.

Deviations from uniformity of dimensions, as tape thickness and sector and segment curvature require a certain amount of bearing play, and this is minimized by building most of the play into the mechanism by providing one bearing in the form of slot 123. In theory, however, the bearings could be all conventional rotary bearings of circular form so located and providing just enough play so that the various effects described above as tending to create bearing friction, would be nullified. However, insofar as the tape bending-effect and tape-tension effect compromise is concerned, manufacturing tolerances would be such that proper bearing location for optimum segment-sector spacing would be separately determined for each tape movement.

The slot 123 completely obviates any need to determine proper bearing location separately for each tape movement, the reason being that the slot 123 permits the shaft 112 to seek its own level, so to speak, and that level happens to be one wherein the spacing between sector and segment is optimum, not only insofar as dimensions and variations are concerned, but also with respect to the tape-bending effect and the tape-tension effect.

The resultant sector-segment spacing is sufficiently small that the tension effect, i.e., that effect leading to a centering tendency on the part of the sector is practically zero. As a result, the winding tension due to the bending moment involved in wrapping the tapes flush to the segment and sector surfaces simultaneously increase and decrease as one tape respectively wraps and the other unwraps, and cancel out, so that the torque needed to deflect the sector is determined solely by frictional and gravitational effects in the parts of the movement and is substantially independent of the stiffness per se of the tapes, and of the spring 120.

Other novel features of the tape movement worthy of note relate to the location of shaft 112 and its bearing 113. It is found that if the effective point of application of tape tension to segment 115 is about four or more times as far to said bearing 113 as it is to the slot 123, the bearing thrust due to said tension is predominantly created against the side of slot 123. Therefore, if the bearing end in slot 123 of shaft 112 is made quite small, particularly with respect to the bearing portion of shaft 112 in its bearing 113, the said bearing portion can be quite large to suit such requirements as that of having a pointer mounted thereon, yet the friction torque resulting from tension will be less, or at least no more than that which would be generated in a more conventional arrangement utilizing a uniform shaft and/or a segment centered with respect to the bearings of its shaft.

It is quite important to squeeze out the minutest improvement in frictional and other effects that would degrade performance. As was noted previously, the parts of the tape movement are preferably built up from lightweight sheet material. Thus, segment 115 may be an open cup or drum, and, as evident from FIGURE 3, sector 114 is a simple lamina having stiffening webs 114*a* and 114*b* and a curved shoe 122 spot welded thereon. This construction, of course, minimizes inertia, and contributes to obtaining a suitably high resonant frequency. The construction also solves the difficult manufacturing problem of providing a sector having a perfectly cylindrical tape-receiving surface adjacent the segment 115. Specifically, it is easy to stamp out the sector having both integral webs and a practically perfectly circular edge at the place where it is joined to the shoe. It is then found that a flat strip of sheet material can be juxtaposed to the said edge and held to its circular conformation in a jig of some sort. If the said strip is spot welded to the edge of sector 114, say at tabs 122*a*, 122*b*, 114*c* and 114*d*, while being held in the said jig, shoe 122 is the result and has as nearly as perfect a cylindrical curvature as could be expected from machining the entire sector out of one piece of stock. Tabs 122*a, b* and *c* are struck out of shoe 122, and tabs 114*c* and *d* are struck up from the plane of sector 114 like the webs 114*a* and *b*.

To complete the sector, a plate 124 having webs 124*a* and 124*b* clasping the vertex end of the sector is welded to the sector. Inspection of FIGURE 3 will make it readily apparent that the several webs and tabs, and the said plate and shoe cooperate to make the overall sector a rigid yet light structure. Shaft 111 is integrally secured to the sector 114 by any convenient means, and a hole 125, corresponding to that through ear 121 (FIGURE 6) is provided in web 124*a*.

Exaggerating the length of shaft 112, allows bearing 113 to be relatively far-removed from segment 115, which mounts the pointer, thus allowing the segment end of the shaft 112 to shift in slot 123, without causing the pointer to be tilted too much toward a scale plate indicated fragmentarily at 73*a* (FIGURE 2). Such tilting, even if short of causing the pointer to strike the scale plate, detracts from the appearance of the instrument and can cause errors of observation of pointer position with respect to the scale.

It will be noted that tape movement is essentially sealed in a casing including base 104, and a cover plate 104*b*, said base having a flanged portion 104*a* providing an upstanding wall surrounding the tape movement and the cover plate 104*b*. The usual practice is to house a gauge movement, or the like, only insofar as the remainder of the mechanism in which it is found is housed. However, the tape movement according to the invention is pre-calibrated, so to speak, and once assembled, needs no attention short of becoming defective, the chances of which are minimized because the casing of the movement is so proportioned as to prevent sector from movement to great enough extent to overstress the tapes or to distort or bend the drum-like segment 115.

As there is nothing in the moving parts of the mechanism to be adjusted, there is no point in exposing the movement at all in the field. In service, therefore, the movement can be expected to function faultlessly even in the presence of dust, moisture, or other deleterious airborne matters, and more or less proof against tampering or mishap of various sorts.

Nipple 109 and shaft 112 extend somewhat further to the right in FIGURE 2 than shown (as is suggested by the break in the showing of the said shaft and nipple in FIGURE 2). The end of nipple 109 provides a useful means for centering the scale 73, and, if desired, a circular ledge 109*a* may be provided upon which to rest the scale plate. To this end, scale plate 73*a*, shown partly in section is provided with a hole centered on the scale 73 and sufficiently large to slip over the extreme right end of nipple 109, either so that the plate 73*a* rests on the ledge 109*a*, or, in the absence of such ledge, so that the plate rests against suitable posts, or the like (not shown). Any suitable means, not shown, can be provided for fixing scale plate against rotation about the axis of the shaft 112.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. In combination, a pair of elongated substantially inextensible, flexible elements, a movable member having a surface, one of said elements being secured at one end thereof to a first point on said surface, and the other of said elements being secured at one end thereof to a second point on the said surface, said first point being spaced from said second point, and each said element being positioned parallel to each other side by side along said surface, a segment lying across said elements and between said points, said elements being between said surface and said segment; said one of said elements having a portion thereof fixed to said segment, said portion being located between said second point and said segment; said other of said elements having a portion thereof fixed to said segment, the last said portion being located between said first point and said segment, means fixing one part of said segment against movement in a plane parallel to a line joining said points, but permitting rotation of said segment about a point in said plane; means fixing another part of said segment against movement in a direction lying along the length along said surface of said elements but permitting motion of said another part more or less parallel to said plane and transverse to the length along said surface of said elements, and permitting rotation of said segment about an axis transverse to the said length along said surface of said elements and transverse to said plane; said segment being restrained from substantial movement otherwise transversely of said elements; means tensioning said elements; and means mounting said member so as to constrain it for movement so that its said surface moves along a path substantially in a direction corresponding to the lengthwise extent along said surface of said elements.

2. A gauge movement, said movement comprising a segment having a cylindrical surface, a tape fixed at one end to said surface and extending around part of said surface in contact therewith, a sector having a cylindrical surface portion adjacent said surface but spaced therefrom by a thickness of said tape, said surface and said surface portion having their cylindrical axes parallel, and said tape passing between said surface and said surface portion, said tape extending along said surface portion and secured thereto at a point removed from the place where said surface portion and said surface are most closely adjacent; each of said segment and said sector being mounted for rotation about the respective cylindrical axes of said surface and of said surface portion, respectively; one of said segment and said sector having a rotary shaft coaxial with the corresponding axis, one end of said shaft being mounted in a rotary bearing constructed and arranged to permit rotation of said shaft but with a limited amount of side play of said shaft radially of the shaft axis, a member having an elongated slot therein, the other end of said shaft being received in said slot, said slot extending in a direction substantially normal to the curvature of said surface portion, and being of just sufficient width to receive said other end of said shaft therein and to permit rotation thereof.

3. A sealed, low-torque, low-friction, pre-calibrated, maintenance-free, precision instrument movement, said movement comprising a substantially flat sheet-metal sector having an input shaft fixed thereto, said input shaft having its length normal to the plane of the said sector, having a circular edge spaced from said input shaft, the arc of said edge having its center on the said length of said input shaft, a shoe of flat sheet metal secured to said edge and constrained thereby to form a cylindrical surface having the said length of said input shaft as axis, a hollow casing, said casing containing said sector and having a bearing aperture therein for rotably supporting one end of said input shaft with said one end projecting outside of said casing; a cylindrical segment, an output shaft fixed to said segment, said output shaft having its length coincident with the axis of said segment, said casing having a bearing aperture therein for supporting one end of said output shaft with said one end thereof projecting from said casing, said segment, said sector and said bearings being so proportioned and positioned that if the said one ends of said shafts are positioned in said bearings with the lengths of said shafts parallel, the cylindrical surfaces of said segment and said shoe are in or nearly in flush contact with each other, both said bearings being located to one side of the said plane of said sector; a bearing member extending over the other ends of said shafts and on the other side of said sector, said member being fixed to said casing and having a bearing for rotatably receiving the other end of said input shaft, said member being so positioned that the three said bearings lie in a plane normal to the plane of said sector, a slot in said member, said slot having straight sides and the other end of said output shaft being cylindical with respect to the axis of said segment and being received in said slot, said slot having straight sides spaced the width of said other end of said output shaft, each said straight side having a length several times the width of the cylindrical portion of said output shaft, said slot being oriented so that the center line thereof lies along a radius of said sector and such that one portion thereof is located at a greater distance from said center of said arc than said other end of said output shaft when said output and input shafts are parallel, and having another portion thereof located sufficiently close to said input shaft to permit said shafts to be arranged parallel to each other; a pair of thin flat tapes, each having one end thereof fixed to said sector with said shoe lying between the said one ends of said tapes, the said one end of one of said tapes being located to one side of and spaced from said plane including the first said three bearings, the said one of the other of said tapes being located to the other side of and spaced from the last said plane; the other end of said one of said tapes being fixed to the cylindrical surface of said segment at a place thereon on the said other side of the last said plane, and the other end of said other of said tapes being fixed to the cylindrical surface of said segment at a place thereon on the said one side of the last said plane, said tapes being tensioned between their said one ends and being positioned with their lengths lying parallel to each other, said lengths lying between and flush to the cylindrical surface of said shoe and said segment; the second said bearing being oriented a distance from said segment that is large compared to the distance of said slot from said segment, the said one end of said output shaft being in the form of a cylindrical portion of large diameter compared to the diameter of the cylindrical portion of its said other end, the said cylindrical portion of said one end of said output shaft being received in said second-said bearing, said second said bearing allowing sufficient play to the last said cylindrical portion such as to allow said segment to move along said slot for several times the thickness of said tapes, from a point where the cylindrical surfaces of said segment and sector are separated by only the thickness of said tapes; said casing having fixed parts located so as to cross the said plane of said sector but on opposite sides of said sector with respect to the aforesaid plane containing the said first-said three bearings, said fixed parts being spaced far enough apart to permit said sector to deflect about the length of the said input shaft for an angular distance corresponding to that subtended by said shoe, a portion of said casing overlying said bearing member being separate from the remainder of said casing but constructed and arranged to be secured sealingly thereto, whereby said movement is entirely contained within said casing save for the said one ends of said shafts, to the extent that the latter extend outside of said casing.

4. The invention of claim 3, including, in combination, a low-energy condition responsive device adapted to produce a low-energy motion proportional to the magnitude of said condition in response to said condition, linkage for transferring said low-energy motion to the said one end of said input shaft at a place thereon outside of said casing, said linkage having adjustment means for predetermining the quantitative relation between the said low-energy motion and rotation of said output shaft.

5. In a gauge movement of the type including an input element and an output element, each said element being mounted for rotary movement about a rotary axis parallel to the corresponding axis of its fellow, and each said element having a cylindrical surface, the radii of which are those of a cylinder, the axis of which is the same as the said rotary axis of said element, the said cylindrical surfaces being oriented and positioned to be in virtually line contact with each other, there being elongated flexible means of small transverse dimensions forming, in effect, a figure-8 loop about said elements, with the crossing of said loop preventing said line contact by substantially only the thickness of said flexible means; said flexible means being under tension to draw it into substantially continuous contact with said cylindrical surfaces over mutually-adjacent portions thereof extending from points at one side of said line contact to points at the other side of said line contact, bearing means providing for rotation of one of said elements about its rotary axis and bearing means providing for rotation of the other of said elements about its rotary axis; one of said bearing means also providing for cocking of one of the said elements in a direction such as to tilt the rotary axis thereof out of parallel with and away from the other rotary axis and in the plane defined by said axes when parallel, and the other of said bearing means providing for substantially only rotary motion.

6. The invention of claim 5, wherein each of said elements is provided with a rotary shaft fixed thereto; said shaft providing for rotary motion of the corresponding element about the corresponding rotary axis, one said bearing means including rotary bearing portions providing for substantially only rotary motion of one said shaft, the other said bearing means having a bearing portion providing for substantially only rotary motion of one end of the last said shaft, the said other said bearing means having a further bearing portion in the form of a slot having parallel spaced sides, said shaft of the corresponding one of said elements having an end portion received in said slot, said end-portion being in the form of a cylinder of diameter equal to the spacing of the said sides of said slot, the said slot being positioned so that it is bisected by a straight line joining said rotary axes, there being provided sufficient play in the former said bearing portion and said slot being of sufficient extent to permit the latter said shaft to move its said end portion along said slot from a position where the corresponding said element is next adjacent the other said element, to a position where the said cylindrical surfaces are separated by a distance amounting to several thicknesses of said elongated flexible means.

7. In a gauge movement of the type including an input element and an output element, each said element being mounted for rotary movement about a rotary axis parallel to the corresponding axis of its fellow, and each said element having a cylindrical surface, the radii of which are those of a cylinder, the axis of which is the same as the said rotary axis of said element, the said cylindrical surfaces being oriented and positioned to be in virtually line contact with each other, there being elongated inextensible, flexible means of small transversion dimensions forming, in effect, a figure-8 loop about said elements, with the crossing of said loop preventing said line contact by the thickness of said flexible means; said flexible means being under tension to draw it into substantially continuous contact with said cylindrical surfaces over mutually-adjacent portions thereof extending from points at one side of said line contact to points at the other side of said line contact, bearing means providing for rotation of one of said elements about its rotary axis and bearing means providing for rotation of the other of said elements about its rotary axis; one of said elements being provided with a shaft fixed thereto, said shaft having cylindrical end portions, said end portions having a common axis coincident with axis of rotation of said one of said elements, and the said bearing means corresponding to the last said element, and providing for rotary motion thereof, having bearing surfaces against which said end portions are urged if the other of said elements is rotated about its said rotary axis; said cylindrical end portions being disparate in diameter, and said one of said elements being located relatively near the bearing surface for the cylindrical end portion of lesser diameter, and the bearing surface for the cylindrical end portion of greater diameter being located relatively remote from said one of said elements, said flexible means being arranged to apply tension to said one of said elements at a place such as to correspond to said one of said elements insofar as relative proximity to the bearing surfaces for said cylindrical end portions is concerned.

8. In a gauge movement of the type including an input element and an output element, each said element being mounted for rotary movement about a rotary axis parallel to the corresponding axis of its fellow, and each said element having a cylindrical surface, the radii of which are those of a cylinder, the axis of which is the same as the said rotary axis of said element, the said cylindrical surfaces being oriented and positioned to be in virtually line contact with each other, there being elongated, inextensible flexible means of small transversion dimensions forming, in effect, a figure-8 loop about said elements, with the crossing of said loop preventing said line contact by the thickness of said flexible means; said flexible means being under tension to draw it into substantially continuous contact with said cylindrical surfaces over mutually-adjacent portions thereof extending from points at one side of said line contact to points at the other side of said line contact, bearing means providing for rotation of one of said elements about its rotary axis and bearing means providing for rotation of the other of said elements about its rotary axis; said elements and said flexible means being provided with a casing, and said casing totally enclosing said elements and said flexible means, there being provided a pair of shafts, one for each of said elements and fixed thereto, each said shaft providing for rotation of the corresponding element about its said rotary axis, said casing being provided with apertures including bearing means surrounding said shafts in rotary-bearing fashion, with portions of said shafts protruding through the last said bearing means into the space external to said casing.

9. In a gauge movement of the type including an input element and an output element, each said element being mounted for rotary movement about a rotary axis parallel to the corresponding axis of its fellow, and each said element having a cylindrical surface, the radii of which are those of a cylinder, the axis of which is the same as the said rotary axis of said element, the said cylindrical surfaces being oriented and positioned to be in virtually line contact with each other, there being elongated inextensible flexible means of small transversion dimensions forming, in effect, a figure-8 loop about said elements, with the crossing of said loop preventing said line contact by the thickness of said flexible means; said flexible means being under tension to draw it into substantially continuous contact with said cylindrical surfaces over mutually-adjacent portions thereof extending from points at one side of said line contact to points at the other side of said line contact, bearing means providing for rotation of one of said elements about its rotary axis and bearing means providing for rotation of the other of said elements about its rotary axis; one of said elements being in the form of a flat sheet metal sector having a circular edge the radii of which are copunctual at the axis of rotation of said elements, a sheet metal shoe curved in the form of a cylindrical surface having the same radius of curvature as said circular edge, means securing said shoe to said edge with the radii of said shoe coinciding with the radii of said circular edge.

10. In a tape movement having a pivoted sector, a cylindrical segment mounted for deflection about parallel axes, and tapes interconnecting said segment and sector, the improvement comprising a sector in the form of a member providing a circular edge having its center on the deflection axis of said sector, and a cylindrical shoe of uniform thickness, and means fixing said shoe to the periphery of said edge, the cylindrical axis of said shoe coinciding with the axis of said sector.

References Cited

UNITED STATES PATENTS

| | | | |
|---|---|---|---|
| 2,718,896 | 12/1952 | Jones. | |
| 2,948,887 | 8/1960 | Mounteer et al. ______ | 74—89.2 |
| 2,987,930 | 6/1961 | Erbghth et al. ________ | 74—89.2 |
| 3,160,007 | 12/1964 | Tate et al. | |

FRED C. MATTERN, Jr., *Primary Examiner.*

W. S. RATLIFF, *Assistant Examiner.*